May 24, 1966  SHIRO KANEKO  3,252,219
KNIFE
Filed July 20, 1964

Shiro Kaneko
INVENTOR.

BY Wenderoth,
Lind and Ponack, attys.

United States Patent Office 3,252,219
Patented May 24, 1966

3,252,219
KNIFE
Shiro Kaneko, Tsubameshi, Japan, assignor to Fuji Shokuhin Company, Limited, Niigataken, Japan, a limited-liability company of Japan
Filed July 20, 1964, Ser. No. 383,763
3 Claims. (Cl. 30—355)

The present invention relates to knives, particularly to those for table use.

Ordinary table knives having a wavy cutting edge are to apt to damage a dish which is made of comparatively soft material such as melamine resin, when cutting food, for example meat on said dish.

The chief object of the invention is to provide a knife which can readily cut food without damaging a dish of melamine resin receiving said food.

Said knife according to the invention comprises a blade having the cutting edge, which is provided with a great number of small concaves arranged continuously on one side, the deepest portion of each concave being positioned along said cutting edge.

The more specific features and advantages will become apparent from a consideration of the following description.

Figure 1:
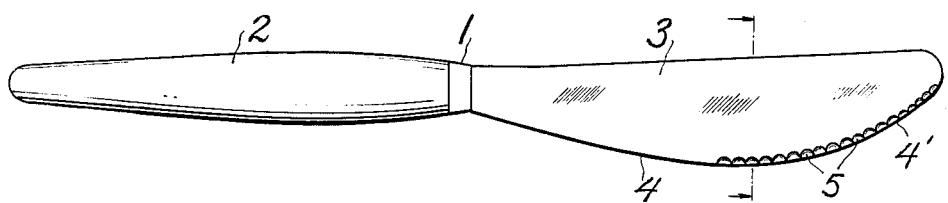
FIG. 1 is an elevational view of a knife according to the invention.

Referring to FIG. 1, 1 denotes the knife which consists of a handle 2 and a blade 3 as in ordinary table knives. The cutting edge 4 of said blade is curved outsides and sharpened.

Figure 2:
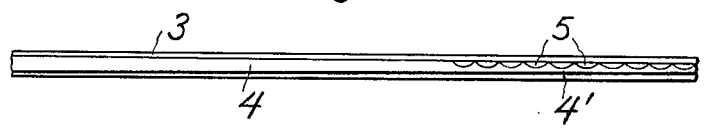
FIG. 2 is an enlarged bottom view of a part of said knife.
Figure 3:
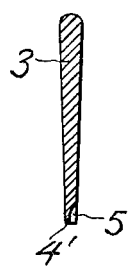
FIG. 3 is an enlarged sectional side view of said knife taken along a section line of FIG. 1.

A forward and almost half part 4' of said edge is provided with a great number of small concaves 5 of preferably semi-circular shape, which are arranged continuously on one side as shown in FIG. 2, the deepest portion of each concave being positioned along the edge part 4' as shown in FIG. 3.

The knife according to the invention is thus constructed.

When using said knife, the edge part 4' is put and reciprocated on food, for example meat in the usual manner, then said meat can be readily cut by the sharper edge part 4' as well as the continuously arranged small concaves 5 which act as a saw.

Moreover, a dish receiving said meat is not damaged, even if said dish is made of comparatively soft material such as melamine resin, since the edge part 4' touches the surface of said dish with a smooth line. On the contrary, ordinary table knives having a wavy edge are apt to damage such soft dish because of touching its surface with many pointed portions.

Without further description it is thought that the features and advantages of the invention will be readily apparent to those skilled in the art, and it will of course be understood that changes in the form, proportion and minor details of construction may be resorted to, without departing from the spirit of the invention or the scope of the appended claims.

What I claim is:

1. A knife comprising a blade having side faces and a cutting edge, said cutting edge being a plane surface extending between the side faces of said blade at an angle substantially perpendicular to the plane of the blade, only one of said side faces having a plurality of concavities therein, said concavities opening out of said cutting edge plane surface, said concavities having their deepest portions along the cutting edge plane surface and extending through less than the thickness of said blade, the portion of the cutting edge plane surface adjacent and along the other of said side faces being unrecessed, so that when the knife blade is used to cut on a relatively soft surface, the cutting edge bears on the soft surface on the plane surface of the cutting edge.

2. A knife as claimed in claim 1 further comprising a handle in which one end of the knife blade is mounted, only the portion of the cutting edge at the end of the blade remote from the handle having said concavities therein.

3. A knife as claimed in claim 1 in which said concavities are semi-circular as viewed from laterally of the blade, with the largest dimension along the cutting edge of the blade.

References Cited by the Examiner

UNITED STATES PATENTS 2,834,108 5/1958 Thompson _____ 30—355

FOREIGN PATENTS

| 905,279 | 4/1945 | France. |
| 951,476 | 4/1949 | France. |
| 1,013,994 | 8/1957 | Germany. |
| 322,398 | 12/1929 | Great Britain. |
| 536,200 | 5/1941 | Great Britain. |
| 608,685 | 9/1948 | Great Britain. |

WILLIAM FELDMAN, Primary Examiner.

JAMES L. JONES Jr., Examiner.